United States Patent
Bossoli et al.

(10) Patent No.: US 7,346,027 B2
(45) Date of Patent: Mar. 18, 2008

(54) METHOD OF UNINTERRUPTED SOFTWARE DOWNLOAD IN HETEROGENEOUS MOBILE COMMUNICATION NETWORKS

(75) Inventors: Francesca Bossoli, Sesto Fiorentino (IT); Stefano Micocci, Castenasco (IT); Gianluca Ravasio, Monza (IT)

(73) Assignee: Siemens AG, München (DE)

( * ) Notice: Subject to any disclaimer, the term of this patent is extended or adjusted under 35 U.S.C. 154(b) by 585 days.

(21) Appl. No.: 10/846,589

(22) Filed: May 17, 2004

(65) Prior Publication Data

US 2004/0233866 A1    Nov. 25, 2004

(30) Foreign Application Priority Data

May 21, 2003  (EP)  .................................. 03425328

(51) Int. Cl.
*H04Q 7/00* (2006.01)
(52) U.S. Cl. .................. 370/328; 370/331; 455/436
(58) Field of Classification Search ................ 370/328, 370/331; 455/436–443; 709/203; 717/168–178
See application file for complete search history.

(56) References Cited

U.S. PATENT DOCUMENTS

2002/0082015 A1* 6/2002 Wu .............................. 455/436

FOREIGN PATENT DOCUMENTS

| EP | 0883266 A2 | 12/1998 |
| EP | 1150521 A1 | 10/2001 |

OTHER PUBLICATIONS

XP-0022557249; Apr. 2003; pp. 1-21; Network Working Group, Request for Coments: 3515; Category: Standards Track; "The Session Initiating Protocol (SIP) Refer Method"; R. Sparks; Sep. 10, 2003; pp. 1-21.
"End-to End SIP Based Real Time Application Adaptation During Unplanned Vertical handovers", Paul A. Pangalos, Konstantinos Boukis, *Luise Burness; *Alan Brookland; *Caroline Beauchamps; A.H. Aghvami; Centre for Telecommunications Research; UK-London and UK-Martlesham Heath; pp. 3488-3493.
3GPP TS 23.228 V6.4.1.(22004-01); "3rd Generation Partnership Project; Technical specification group services and system aspects; IP mulitmedia subsystem (IMS); stage 2 (release 6)"; 3GPP; 650 Route des Lucioles-Sophia Antipolis, F-Valbonne.
Network Working Group, Request for comments: 3261; Osoletes: 2543; Category: Standards Track; "SIP: Session Initiation Protocol"; Rosenberg et al; pp. 1- 269; Jun. 2002.

* cited by examiner

*Primary Examiner*—Lester G. Kincaid
*Assistant Examiner*—Sayed T. Zewari (57) ABSTRACT

A method of non-real time software download in an IP-based mobile communication system with heterogeneous access technologies is based on the session initiation protocol (SIP). For download recovery in case of handover between a first and a second access networks using different access technologies while a software download session is ongoing, the SIP user agent associated with a handovering terminal, upon detecting the handover, sends, without releasing the ongoing session, a transfer request message to a SIP proxy server that has set up and is currently managing the download session, and that server can start operations necessary in order a new session is set up with the user agent in the new location, under the control of a proxy server entrusted with managing the new session, and download is resumed from said last received packet.

11 Claims, 6 Drawing Sheets

METHOD OF UNINTERRUPTED SOFTWARE DOWNLOAD IN HETEROGENEOUS MOBILE COMMUNICATION NETWORKS

CROSS REFERENCE TO RELATED APPLICATIONS

The present application claims priority to European Patent Application EP03425328.6, filed on May 21, 2003, which is herein incorporated by reference.

BACKGROUND OF THE INVENTION

The present invention refers to mobile communications based on Internet Protocol (IP), and more particularly it concerns a method of software download with session mobility support in mobile communication systems, and a mobile communication system employing the method.

Future mobile communication systems beyond the third generation (3G) will be characterised by coexistence of a plurality of access technologies such as cellular (of different generations, in particular 2nd and 3rd generation), cordless, wireless local area network (WLAN), broadcast systems, wired systems etc. These systems will be integrated on a common platform allowing them to complement each other in optimum way and to satisfy different service requirements. The various access systems will be connected to a common, flexible and seamless IP core network.

Taking into account the increasing usage of Internet-like mobile data applications in existing cellular networks, a possible evolution of such networks is towards the definition of a common transport layer based on the IP protocol. The motivation of this choice can be briefly summarised by the following points:
- the core network and the radio access network have the same transport layer;
- base stations from different Radio Access Technologies (RAT) can be connected to the Radio network controller by using the same transport protocol (IP);
- the cellular network and Internet use the same transport protocol, thereby helping the integration of network and application domains.

Following this approach, it results necessary to use IP mechanisms also to manage the mobility of the terminal and so to have a common set of mobility functions able to manage the terminal mobility independently of the radio access technology and in an integrated way with respect to the core network. This approach can be followed using Mobile IP (MIP) and Ipv6 mechanisms, but they don't seem appropriate for the management of micro- or pico-mobility. It is foreseen that a hierarchical solution (HMIP) and the application of different mechanisms should be integrated to resolve different mobility scenarios.

For sake of clarity, we recall here some definitions about different mobility types:
Terminal mobility: The ability of the terminal to change location, and still to be able to communicate. Terminal mobility can be:
  Discrete terminal mobility: The ability of the terminal to make discrete changes while there isn't any user data being exchanged and staying reachable for incoming calls. In the cellular context it means the support of roaming and paging procedures.
  Continuous terminal mobility: The ability to change location while user data exchange may be going on. In cellular context it means the support of handover procedure. It is called seamless if the QoS is not degraded due delay or loss of data during the handover.
Personal Mobility: The ability of end users to originate and receive calls on any terminal in any location (i.e. from different access technologies) covered by his subscription. It means that the location is performed on user based instead of terminal based.
Session Mobility: The ability of a user to change terminal. It can be split in the following categories:
  Discrete Session Mobility: The ability to change terminals while there isn't any user data being exchanged and staying reachable for incoming call. In cellular context it means to be able to reallocate the session to a new terminal and to a new network location.
  Continuous Session Mobility: The ability to change terminals while user data is exchanged. To complete the scenario, we can also define:
Service Mobility: The ability of a user to run the subscribed services irrespective of the location of the user and terminal used.

The new cellular network will be able to provide new value added services, probably coming from Internet world and provided to the user by a multiplicity of different radio access technologies (i.e. 3G, WLAN, etc . . . ). The terminal will be able to support every type of access, that is it will be a multimode and, preferably, a reconfigurable terminal. In this scenario, the network will implement all the functions needed to support the terminal reconfiguration using in efficient way the radio resources. It is clear that, when passing from one radio access technology to another (i. e. when performing a so-called "Vertical Handover" or VHO), a multimode or a reconfigurable terminal behaves as a different terminal, so that the problem of supporting the mobility features relevant to the change of terminal is to be ensured by the network.

Among the new services, software download can be mentioned and the network must be able to define and execute the optimum strategy to perform it. The mobile industry is on the verge of introducing large-scale Internet style, media type independent, download of media objects. One of the areas of deployment for this technology is e-commerce. The most likely objects to kick off the business are ringing tones, screen savers, games and Java midlets.

In the described scenario, it may happen that a user with a multimode terminal initiates a download of a software and during the download process he has to perform a vertical-handover, e.g. from GPRS (General Packet Radio Service) to UMTS (Universal Mobile Telecommunication Service) or from a cellular network to a WLAN, for any reason (out of coverage, need to speed up the process, etc..).

Software download has generally no real-time requirement. In case of vertical handover thus a serious problem arises. The mobility management support during the software download is ensured by the network operator by means of the classical SGSN (Service GPRS Support Node) relocation procedure, which routes the information to the new terminal location. Yet this procedure manages session mobility during horizontal handovers, in which the terminal changes location under the same Radio Access Technology (RAT). In case of vertical handover, no mechanism to manage this kind of reallocation is still implemented. In this case, the download of the software should be aborted and, after the identification of the new position of the terminal, the download of the software has to start again from the beginning.

When the size of the software is small, this process has a light impact on the Quality of Service and on the extra charging of the network (i.e. more network resources to spend for the software retransmission). If the size of the software to download is huge, the implementation of mechanisms able to avoid retransmission becomes crucial to spare radio resources and speed up the download procedure. Moreover, it is possible that a class of software need to be downloaded and installed with high priority (e.g., new operating systems, new radio transmission chains, new protocol stacks, . . . ). For this class of software also it is important to avoid retransmission.

Thus, it is clear that in a short time the network architecture has to include all functionalities that are able to support efficiently reconfiguration and software download in a heterogeneous radio access context.

For the set-up and management of an IMS (IP Multimedia Subsystem) session, that is for packet oriented services that do not have real time constraints, 3GPP (3rd Generation Project Partnership) has proposed Session Initiation Protocol (SIP) as a reference protocol (see for instance 3GPP specification TS 23.228). SIP protocol is an application-layer (signalling) protocol for creating, modifying and terminating sessions with one or more participants for both unicast and multicast sessions and it has been standardised within the Internet Engineering Task Force (see e.g. IETF standard RFC 3261, which is the subject matter of the document "SIP: Session Initiation Protocol" by J. Rosenberg and H. Schulzrinne).

Use of such protocol for assisting application adaptation for IP applications during a vertical handover has been already considered, see e.g. the paper "End-to-End SIP Based Real Time Application Adaptation During Unplanned Vertical Handovers" by P. A. Pangalos et al., GLOBECOM'01, IEEE Global Telecommunications Conference, San Antonio (Tex., USA, 25-29 Nov. 2001), vol. 6, p. 3488-3493. That paper discloses practical tests and evaluation of such use for vertical handover of mobiles that are engaged in a real-time audio call. As known, real-time traffic has stringent time-delay constraints, but admits loss of some packets during handover. Thus, the suggestions contained in the paper are not suitable for non real-time software download, where packet loss cannot be admitted and may result in the need of retransmitting the whole software being downloaded. Moreover, the proposals of the paper are based on the use of the so-called "Re-invite" procedure. Such a procedure however aims at setting up a new session once the user has completed handover, and thus it is not suitable for solving the problems of interest.

SUMMARY OF THE INVENTION

The main object of the present invention is to overcome the drawbacks of the known art and to ensure session mobility during a non-real-time software download process on heterogeneous radio access scheme, in particular in a vertical handover situation.

In a first aspect, the invention provides a method of non-real time software download in an Internet Protocol (IP)—based mobile communication system with heterogeneous access technologies, in which software download sessions are set up and managed by using the session initiation protocol (SIP). For download recovery in case of handover between a first and a second access networks using different access technologies while a software download session is ongoing, the SIP user agent associated with a handovering user equipment, upon receiving a new IP address and a new URL in the second access network, sends, without releasing the ongoing session, a transfer request message ("Refer" message) to a SIP proxy server that has set up and is currently managing the download session, said message containing information about the address and the URL in the first access network, the new URL, the session identity and the last software packet that has been successfully received, said proxy server being thus informed that the session has to be transferred to the user agent at the new URL and starting operations necessary in order a new session is set up with the user agent at the new URL, under the control of a proxy server entrusted with managing the new session and download is resumed from said last received packet.

In a second aspect, the invention provided an Internet Protocol (IP)—based mobile communication system with heterogeneous access technologies in which non-real-time software download is performed by the above method. In such a system, at least some of the users have access to non-real time software download facilities and have equipment allowing connection to the system through a plurality of said access technologies, said user equipment and the system access and core networks being equipped with means, comprising user agent applications and proxy and registrar servers, for setting up and managing software download sessions through the session initiation protocol. For download recovery in case of handover between a first and a second access network using different access technologies while a software download session is ongoing, the SIP user agent associated with a handovering user equipment is arranged, upon receiving a new IP address and a new URL in the second access network and without releasing the ongoing session, to send a transfer request message to a SIP proxy server that has set up and is currently in charge of the download session, said transfer request containing information about the address and the URL in the first access network, the new URL, the session identity and the last software packet that has been successfully received, said proxy server being thus informed that the session has to be transferred to the user agent at the new URL and being arranged to start operations in order a new session is set up with the user agent at the new URL, under the control of a proxy server entrusted with managing said new session, and download is resumed from said last received packet.

BRIEF DESCRIPTION OF THE SEVERAL VIEWS OF THE DRAWINGS

The invention will be better understood form the following description of a preferred embodiment, given by way of non limiting example, with reference to the annexed drawings, in which.

DETAILED DESCRIPTION OF THE INVENTION

Figure 1:
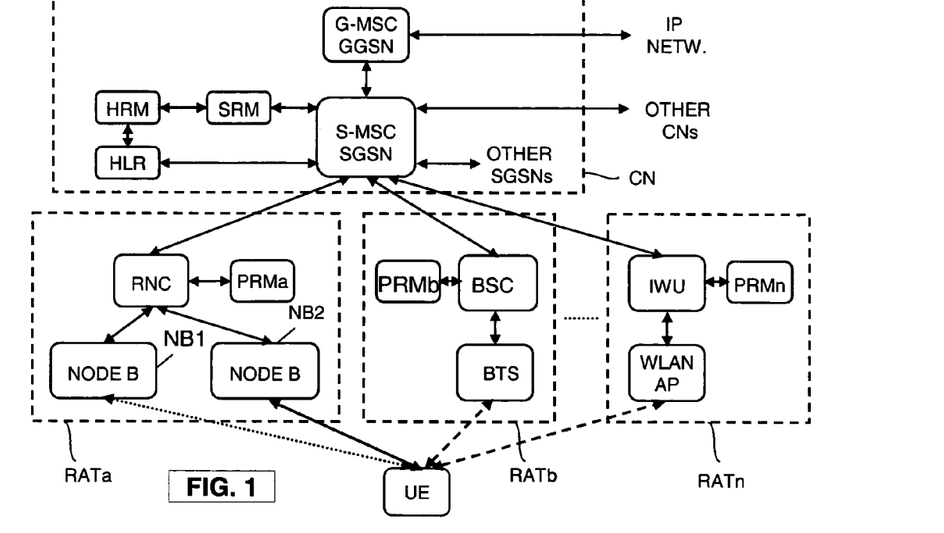
FIG. 1 shows a reference scenario of the application of the invention.

FIG. 1 schematically shows a mobile communication system in which the present invention can be applied. A terminal UE, which can be a multimode terminal or a reconfigurable terminal, can have access to the system through a plurality of different radio access technologies and hence through different radio access networks RATa, RATb . . . RATn. The system part independent of the access technique is referred to as core network, using the terminology of 3GPP, and is indicated here by CN.

By way of example, the drawing shows radio access networks RATa, RATb of cellular systems of 3rd and 2nd generation, respectively, and a wireless local area network (WLAN or hot spot) RATn. Within each block RATi (i =a . . . n), the conventional units of the respective mobile system are indicate by their usual names or acronyms, namely Node B and Radio Network Control RNC for 3rd generation network RATa, Base Transceiver System BTS and Base Station Controller BSC for 2nd generation network RATb, Access Point AP and Interworking Unit IWU for wireless LAN RATn. These units do not require specific description. Two Node B units, NB1 and NB2 are shown in RATa. Similarly, the conventional home location register HLR, and the serving and gateway mobile switching centres and GPRS support nodes S-MSC/SGSN and G-MSC/GGSN, respectively, are shown within core network CN. For simplicity, a single unit SGSN is considered within CN. Connection of that unit to other SGSNs is however indicated, as are the connections of core network CN to fixed-Internet world (through GGSN) and to other core networks (through SGSN).

Terminal UE is supposed to be connected to the system through NB2 in RATa, as shown by the solid line arrow, with possibility of performing both horizontal handovers (to NB1 in the same access network RATa) and vertical handovers (to RATb . . . . RATn, as shown by the dashed line arrows).

In order to support terminal reconfiguration and software download, radio access networks RAT1 . . . . RATn further comprise reconfiguration and download management units PRMa, PRMb . . . PRMn (Proxy Reconfiguration Managers), which can be associated with or included in RNC, BSC or IWU respectively. Core network CN (the home network for terminal UE shown in the drawing) is equipped with higher level units SRM (Serving Reconfiguration Manager) and HRM (Home Reconfiguration Manager) which can be associated with or included in units S-MSC/SGSN and HLR, respectively. By "reconfiguration" we indicate here the whole of the functions allowing a terminal to pass from a radio access technique to another, independently of whether the terminal is a multimode or a reconfigurable one. Note that the terminals could download the software needed for reconfiguration, including the radio access techniques, through the network.

Units PRMi (i=a . . . n), SRM and HRM form a three-level hierarchical distributed structure, with HRM being the top level and PRMi the bottom level, which span across different network domains. A hierarchical distributed structure minimises network load and speeds up software download.

The functions of units PRM, SRM, HRM for reconfiguration and software download in a system of the kind depicted in FIG. 1 are discussed in the documents "Requirements on Network and Security Architecture and Traffic Management Schemes for Download Traffic based on IP Principles in Cellular and Ad Hoc Networks" (IST Project "SCOUT", document D4.1.1), available at web site www.ist-scout.org, and in the document "Reconfigurable SDR Equipment and Supporting Networks Reference Models and Architectures", White Paper of Wireless World Research Forum (WWRF) Working Group 3 (2002). However, for easiness of understanding, some of the functions of units PRMi, SRM, HRM are shortly described here.

Figure 2:
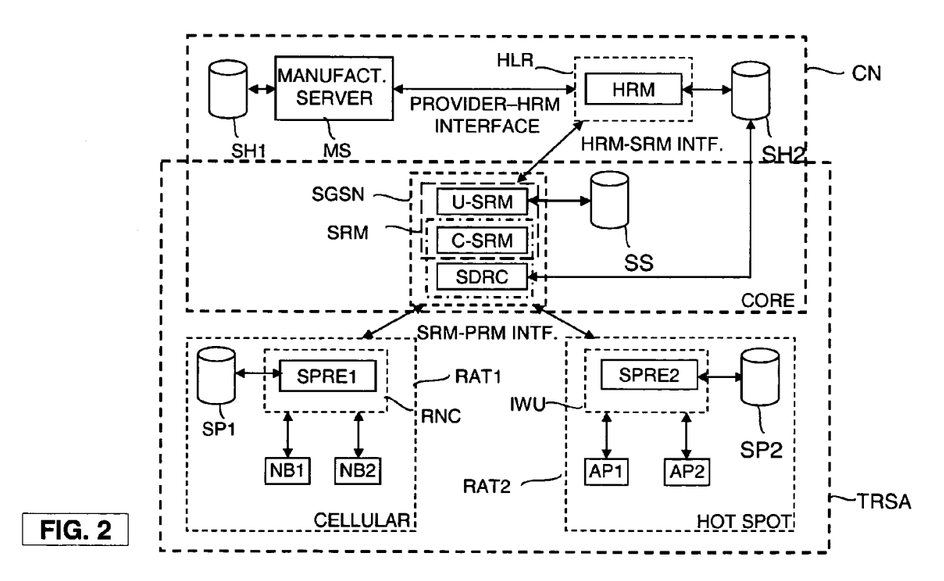
FIG. 2 is a block diagram showing in-more detail the units-involved in reconfiguration and software download management.

For such description, reference is made also to FIG. 2. There, for sake of simplicity, only two radio access networks are considered, e.g. a UMTS network RAT1 (also labelled "cellular") and a WLAN RAT2 ("hot spot"). The reconfiguration entities are here included in RNC, IWU, SGSN and HLR, respectively and are associated with suitable memory units SP1, SP2, SS, SH1, SH2, which will be discussed more in detail below. For consistency with FIG. 1, both networks RAT1, RAT2 include a respective proxy reconfiguration manager PRM1, PRM2, even if a WLAN like RAT2 could rely on the proxy reconfiguration manager of the cellular network. Since PRM1, PRM2 are connected to the same unit SRM in core network CN, networks RAT1, RAT2 are said to belong to a same Terminal Reconfiguration Serving Area, denoted by dashed-line block TRSA. The description of FIG. 2 will essentially address the aspects concerned with software download.

Units PRMi (i=1, 2) are the contact points for every terminal attached to radio access networks RATi. Such units are mainly involved in mode monitoring, mode negotiation, mode switching and software download functions. For negotiation and information processes, control traffic is transmitted to and from PRMi, whereas in case of software download, the appropriate software data packets are transported through PRMi. Such units can been split into two parts representing the user plane functions (blocks SPREi in FIG. 2, SPRE being the acronym of Software Download and Profile REpository) and the control plane functions (block SDRC in FIG. 2, SDRC being the acronym of Software Download and Reconfiguration Controller). Blocks SPREi collect all profiles and information needed for performing reconfiguration and software download. Moreover such blocks are to obtain the software modules from the respective memory unit or repository SPi and to forward them to the terminal. SPi generally is a cache memory for frequently requested software (reconfiguration software for the terminals of its RAT or other software) stored at upper levels, but it could also store some of the software that can be. Having frequently-requested software in PRMi reduces considerably the time for performing the download and also releases the network of great part of traffic allowing a more efficient use of network resources. Block SDRC, as it is evident from its name, hosts the control functions for reconfiguration and download. In particular, it will control servicing the download request for software modules present in the associated memory SPi and will forward the request to the upper levels if the software is not present in SPi.

Unit SRM is connected to all units PRMi in its TRSA and is associated with memory means SS, storing i.a. reconfiguration software for all radio access techniques in said TRSA. SS includes an actual software database and it may also include a cache memory for software coming from upper levels. Like units PRMi, also SRM can be subdivided into two blocks C-SRM and U-SRM entrusted with control and user plane functions, respectively.

Control plane functionality C-SRM has essentially two tasks:

managing the appropriate control message exchange between the terminal (via PRM, and more particularly via SDRC) and the entities managing AAA (authentication, authorisation and accounting) processes in the operator network, if the user wants to perform a handover or to download a software part requiring authorisation;

location update (or macro mobility function): SRM stores the location of every controlled terminal in its TRSA: for example if there is a mass upgrade waiting, the SRM has to know to which PRM the software module must be forwarded.

User Plane Functionality U-SRM of SRM is in turn entrusted with SW Download Provisioning function, by receiving requests for software that is located neither at unit PRMi of network RATi currently used nor at the neighbouring PRMs. U-SRM will serve the requested software to PRM, if it is stores in SS; otherwise U-SRM further redirects the request to HRM and sending the software to PRM once it has been obtained.

Unit HRM has to made available all software not present at lower levels, including new software upgrades it is informed of by providers and can be connected to several units SRM. In case of an upgrade, the HRM notifies SRM about the availability of new software and forwards it to SRM when necessary. If a request for software download arrives at HRM, it is also responsible for the authorisation of the terminal, provided that the software is licensed, and for charging the user for software download. In this case, HRM uses a charging repository, which is updated if the software concerned is downloaded.. Block SH1 shows the whole of the software data bases accessible by HRM through respective manufacturer servers, shown in the whole by block MS, and SH2 shows the charging repository (or AAA server). The latter server is also connected to the control plane part C-SRM of SRM.

According to the invention, the software download sessions are managed by means of SIP protocol in such a manner as to support session mobility. SIP is a textual Client-Server protocol modelled after the Simple Mail Transfer Protocol (SMTP) and the HyperText Transfer Protocol (HTTP). As in any other textual client-server protocol, the client issues requests, and the server returns responses. For facilitating understanding, some definitions of SIP components and functions used in the invention are recalled here:

"User Agent Client" (in the following simply referred to as "SIP client") is the calling user agent, that is a Client application that initiates the SIP request;

"Proxy" (or "proxy server") is an intermediary program that acts as both a server and a client for the purposes of making requests on behalf of other clients; requests are serviced internally or passed on to other servers, possibly after translation;

"Registrar" is a server that accepts registration requests and that is typically co-located with a proxy server;

"Invite" is the procedure used to set up a call;

"Register" is the procedure allowing a user to convey location information to a server, in order the server may map an incoming address into an outgoing address that will reach that user;

"Bye" is the procedure for session termination.

In order to ensure session mobility the present invention also uses the "Refer" method. This method is a recently standardised SIP extension enabling many applications, including call transfer. The "Refer" method indicates that the recipient of the refer message, identified by the Request-URI (Universal Resource Identifier), should contact a third party by using the contact information provided in the request. The "Refer" method is disclosed in IETF standard RFC 2315, which is the subject matter of the document "The SIP Refer Method", by R. Sparks, available at site http://www.ietf.org/rfc.html The set-up of a session for software download and its recovery in case of vertical handover will now be disclosed with reference to the block diagrams and the graphs of FIGS. 3 to 10. Terminal UE is assumed to be connected to RAT1 when starting the download and to perform a vertical handover to RAT2 during download.

The block diagrams in FIGS. 3, 5, 7 and 9 show the SIP components concerned by the invention and the paths of SIP messages, the latter being denoted by thick line arrows. In particular, dashed lines are used for the "register" messages; solid lines for the "invite" and "ok" messages (joined into a single bidirectional arrow); dashed and dotted lines for the "Refer" messages. A dotted line arrow denotes the download and a double dashed-line arrow denotes the checks with the repositories. Units shown also in FIGS. 1 and 2 are indicated by the same reference symbols. For sake of simplicity of the drawings, the standard units of the mobile communication system have been omitted in the block diagrams and only the reconfiguration and software download management units are indicated, since they are the entities hosting the SIP components. On the other hand, the location of such management units with respect to the units of the mobile communication system has been illustrated with reference to FIGS. 1 and 2. Also memory unit SH2 and the manufacturer server MS have been omitted for sake of simplicity.

The block diagrams clearly show that, according to the invention, a hierarchical structure of SIP proxies is proposed, in order to develop a flexible and scalable solution. In particular:

terminal UE hosts a SIP client (CL) that has to start the registration phase and the session when the download request is triggered by the terminal itself;

units PRM1, PRM2 and SRM host respective SIP Proxy Servers PX1, PX2, PX3 (which are the first contact point for the SIP client and perform the set-up and the management of the session) and registrar servers RG1, RG2 and RG3 performing the registration of the terminal in the network.

As said before, a single unit SGSN linked with RAT1 and RAT2 is considered and, by way of example, the case of download of software present in SP1 (FIGS. 3, 4 and 7, 8) or in SS (FIGS. 5, 6 and 9, 10) is described. Thus, only two levels in the SIP structure are shown. The proposed solution is anyway open to an extended architecture, e.g. to the case of RATs connected to different SGSNs. In fact the method is scalable and can be successfully applied to more complex architectures.

In the graphs, the following identifiers for the SIP components are used:

Terminal (SIP Client) initial address: user1@rat1.core.net
SIP Client address after moving: user1@rat2.core.net
PX1: prm1@rat1.core.net
PX2: prm2@rat2.core.net
PX3: srm@core.net.

Figure 3:
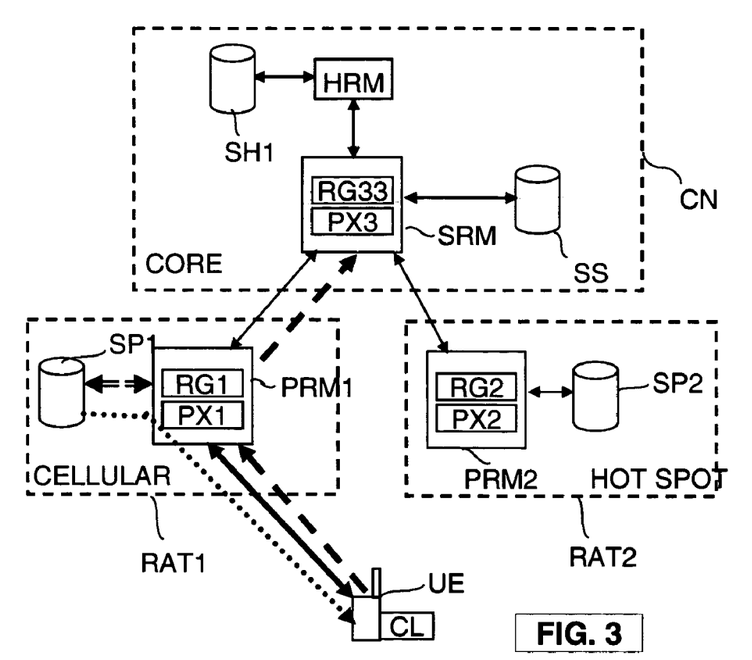
FIG. 3 is a simplified block diagram showing the paths of SIP messages for software download in a first example of application of the invention.
Figure 4:
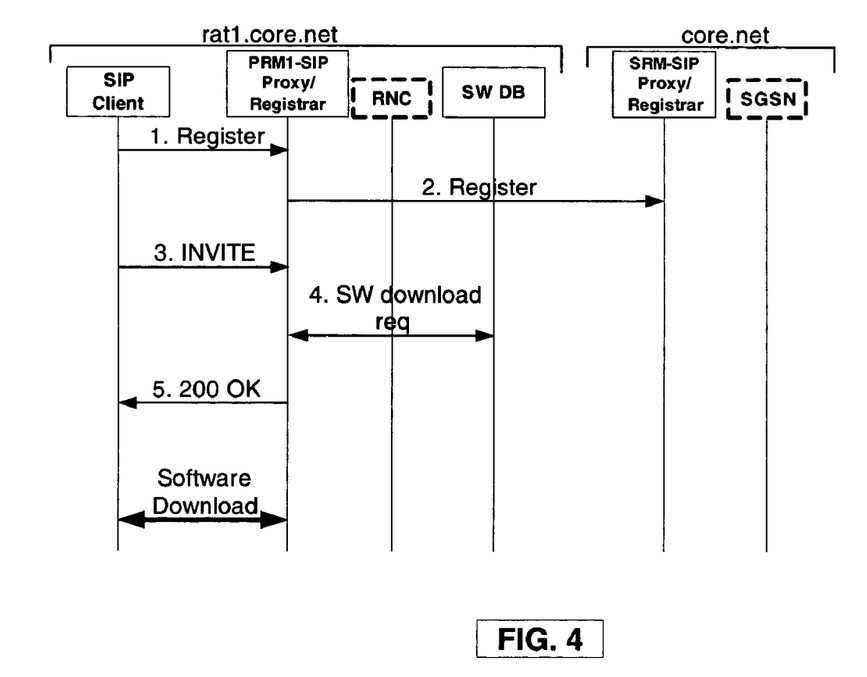
FIG. 4 is a graph of the signalling flow for the download shown in FIG. 3.

Referring now to FIGS. 3, 4, the process of setting up a session for software download from PRM1 is as follows:

1. SIP client (terminal UE) performs registration at SIP proxy PX1 in PRM1;
2. The REGISTER message is stored in RG1 and then forwarded to the higher level server PX3 in SRM. The identity of UE is then stored at SRM level in SIP register RG3.
3. SIP Client sends an INVITE message towards PRM1, in order to start the SIP session. The message (as far as the information of interest for the present invention is concerned) could look as follows:
   INVITE prm1@rat1.core.net
   Via [prm1@rat1.core.net]
   From user1@rat1.core.net
   To prm1@rat1.core.net Call ID xyz123
4. PRM1 checks whether the software is in its repository SP1. The response is positive.
5. An OK message is sent back from PX1 to UE, so that the session is established and software download starts properly towards UE.

Software download takes place with the rules set forth by SIP. Note that PX1 does not store the software being downloaded even if some buffering will be of course provided to adapt traffic incoming to and outgoing from PX1. The arrow "Software download in the signalling diagram extends from the proxy to the client, since it refers to the control signalling and not to the actual software packets.

Figure 6:
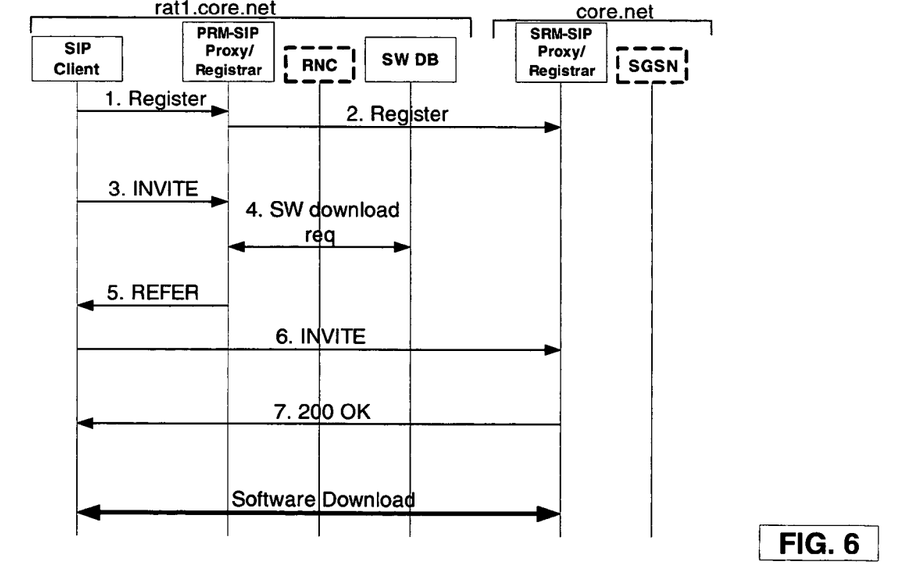
Figure 8:
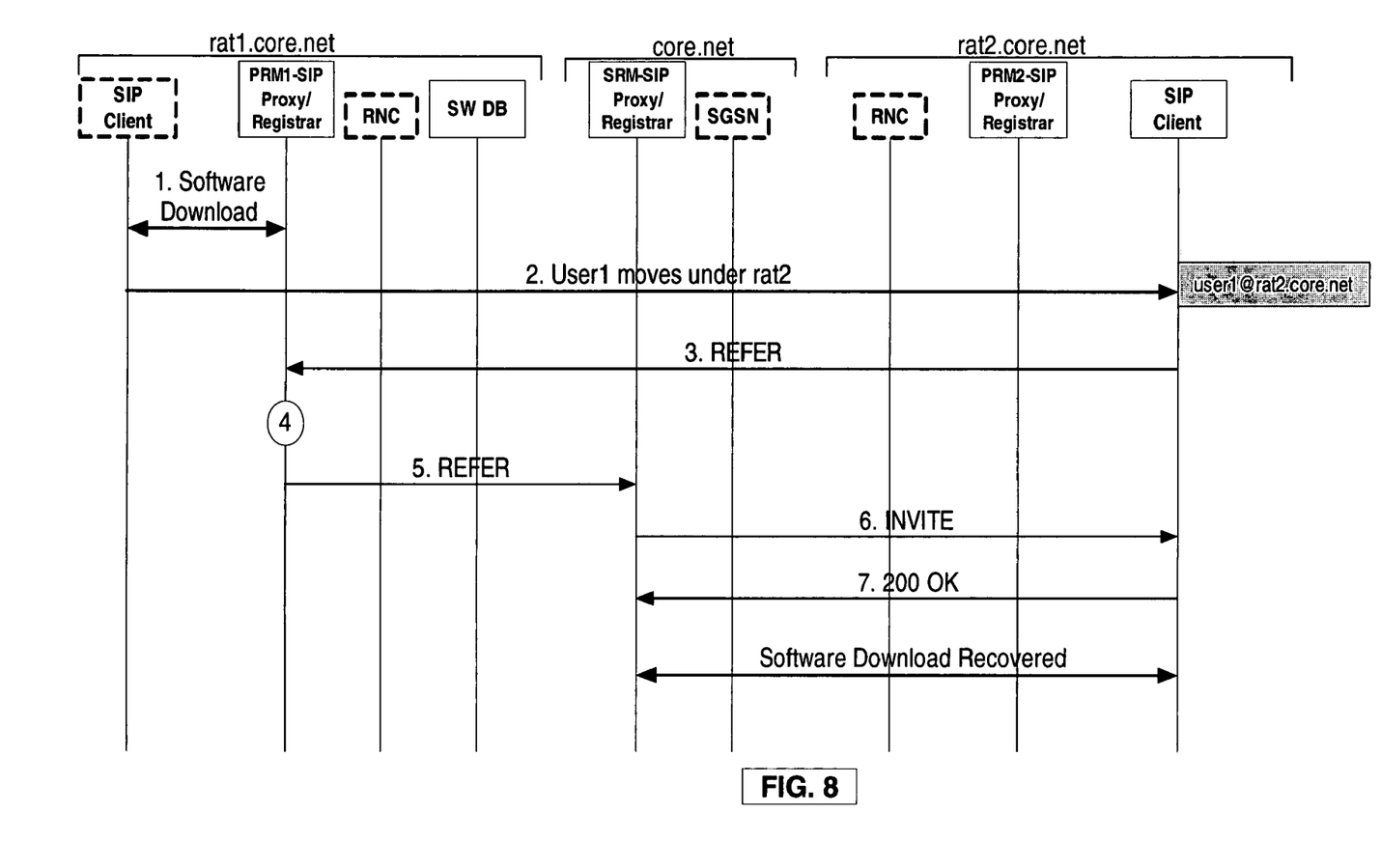
Figure 10:
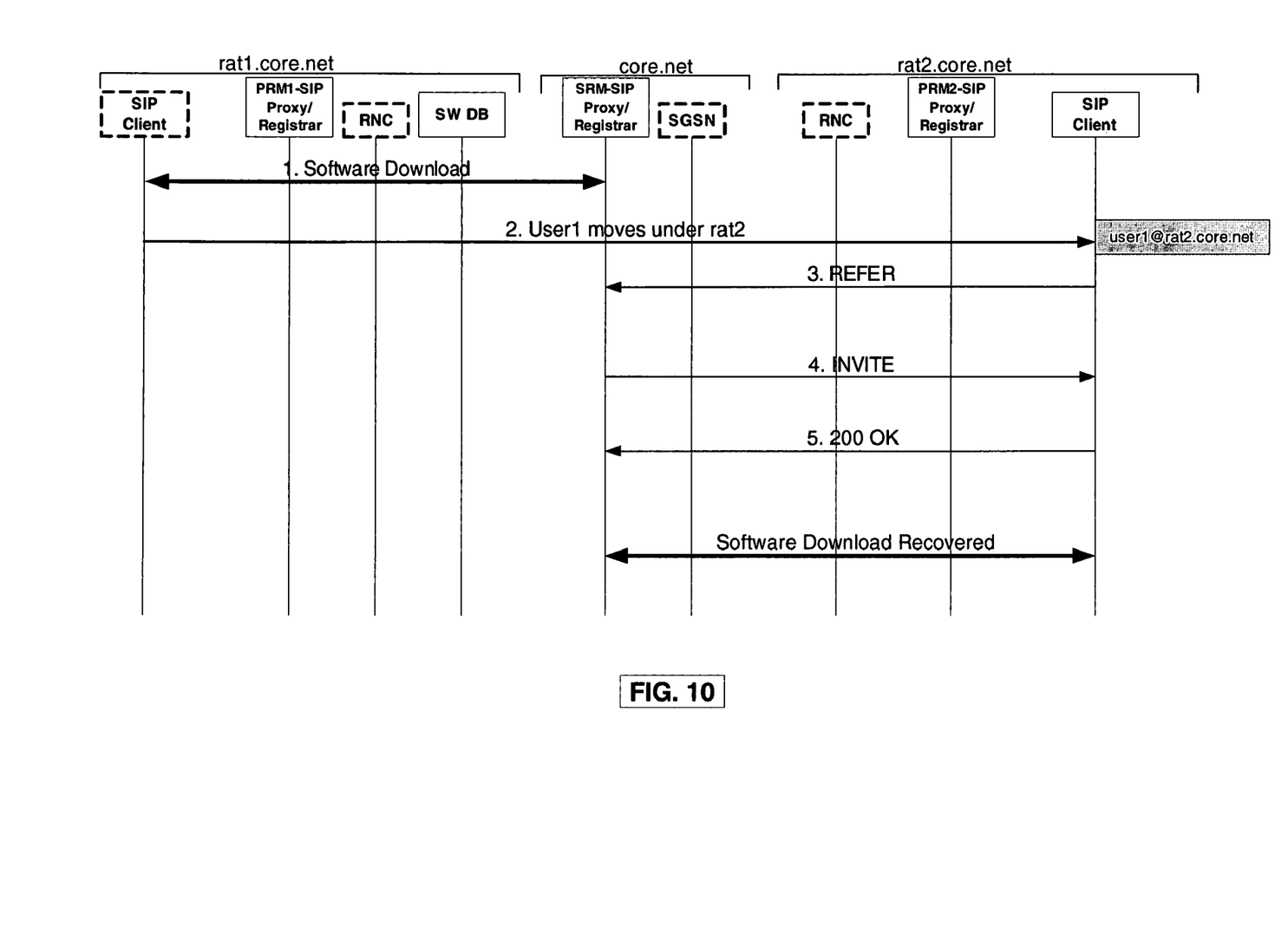

In the above message, as well as in the messages mentioned in connection with FIGS. 6, 8 and 10, no explicit reference has been made to the message structure (request line, header, body), since the structure is as defined by the SIP protocol standards and is not affected by the present invention. We only recall that the body includes a number of parameters (known as SDP parameters, where SDP stands for Session Description Protocol) containing information, i.a., about the session features, time information and information about the media concerned by the session. Including here the list of such parameters is not necessary, since they are defined in IETF standard RFC 2327, which can be found at the above mentioned IETF site. One of the parameters describing session features (e.g. parameter s=session name or parameter i=session information) will indicate that the session concerns download of the desired software module. Moreover, since the invention aims at recovering a software download from the last packet received at the moment of the vertical handover, it will be necessary to trace the progressive number pktn of the packets downloaded: the optional session attribute lines (parameter a) can be used for that aim. Of the above two SDP parameters, only the "packet number" parameter is explicitly indicated (in the messages concerning the recovery phase).

Figure 5:
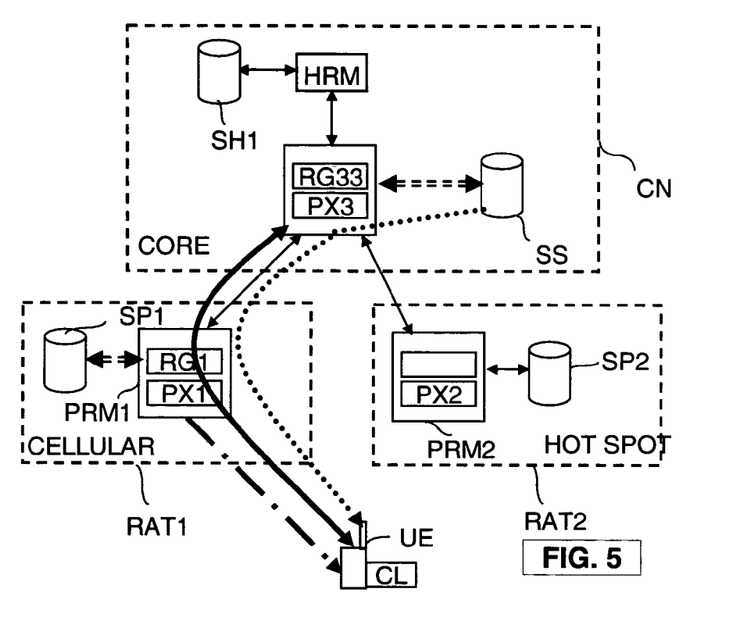
FIGS. 5 and 6 are a block diagram and a graph similar to FIGS. 3 and 4, respectively, relevant to software download in a second example of application of the invention.

When download takes place from SRM (FIGS. 5, 6), the user starts a session with PRM1, as before, and repeats steps 1-4 above. The "register" messages and the "invite" message to PX1 are no longer shown in FIG. 5 for clarity of the drawing. In this case the check on the existence of the requested software in SP1 at step 4 has a negative outcome. Then, the following steps are performed:
5. As PRM1 detects that the software to be downloaded is not present in SP1, it sends towards UE a "Refer" message, in order to transfer the existing session to the higher level SIP Proxy (i.e. SRM). PRM1 (referred by) tells to UE (user1) that the existing session (Call ID) has to be transferred to SRM ("Refer" to). The "Refer" message can look as follows:
   REFER user1@rat1.core.net
   Via [prm1@rat1.core.net]
   From prm1@rat1.core.net
   To user1@rat1.core.net
   Call ID xyz123
   Refer to srm@core.net
   Referred by prm1@rat1.core.net
6. Upon receipt of the "Refer" message, UE sends a new INVITE message toward PX3 in SRM. The NEW INVITE message looks as follows:
   INVITE srm@.core.net
   Via [prm1@rat1.core.net] [srm@core.net]
   From user1@rat1.core.net
   To srm@core.net
   Call ID xyz123
7) Assuming that the presence of the software in SS is prealably known, an OK message is sent back to UE. The session is established and software download starts. In case the presence of the software in SS is not prealably known, INVITE message 6 will be followed by a check like that of step 4 (the check is indicated in FIG. 5).

In both cases the session is closed at the end of download (through a message BYE, not shown in the graphs), if terminal UE still is under the radio coverage of RAT1.

It will be appreciated that even when download takes place at PRM level, the "Register" message is forwarded to all upper level registrars, so that also the upper levels know the terminal location. This is advantageous in order to cope with download recovery, as will be seen below.

The case in which terminal UE passes from location UE(1) under the radio coverage of RAT1 to location UE(2) (in phantom lines) under the coverage of RAT2 during download will now be described. In case the software is being downloaded from repository SP1 of PRM1 (FIGS. 7 and 8), it is assumed that such software also is stored in repository SS of SRM. The messages indicated in FIGS. 3 and 5 are no longer shown in FIGS. 7 and 9. The download initiated under RAT1 is still indicated, even though in thinner lines.

In FIG. 8, the download in progress and the vertical handover are shown at steps 1, 2. Under the coverage of RAT2, UE gets a new IP address and also a new URL, in this case user1@rat2.core.net. Terminal mobility is handled according to MIP (IPv6) mechanisms. Those mechanisms are conventional and need not to be described here.

After getting the new IP address, UE is aware to be under a different subnet and tries to recover the download session. Among other SIP parameters, UE has stored the identity of the session previously ongoing (Call ID), the sequence number of the last packet properly received (SDP parameter "pktn") and his old URL. UE sends a "Refer" message towards PX1 (step 3 in FIG. 8) in order to transfer the ongoing session to his new URL. The message contains, i.a., the old URL (field Referred by) and can look as follows:
   REFER user1@rat2.core.net
   Via [prm2@rat2.core.net] [srm@core.net]
   From user1@rat2.core.net
   To prm1@rat1.core.net
   Call ID xyz123
   Refer to user1@rat2core.net
   Referred by user1@rat1.core.net
   SDP: Pktn: 1453

PX1 is configured not to answer to the "Refer" message; it simply ignores the message but gets the new URL of UE, the Call ID and the reference to the last packet properly received (step 4 in FIG. 8).

Then PX1 sends a further "Refer" message ("Refer" message n° 5, triggered by "Refer" message n° 3) towards SRM, in order to transfer the session previously established with the old URL. The new "Refer" message has the scope to make SRM aware that a session identified by the CallID parameter has to be initiated towards UE at his new URL, and that SRM is to get the same software from its repository and to start the download from the packet indicated. That second "Refer" message looks as follows:

REFER user1@rat2.core.net
Via [srm@core.net]
From prm1@rat1.core.net
To srm@core.net
Call ID xyz123
Refer to user1@rat2core.net
Referred by user1@rat1.core.net
SDP Pktn: 1453

SRM sends an INVITE message to UE at his new URL (user1@rat2.core.net):

INVITE user1@rat2.core.net
Via [prm2@rat2.core.net]
From sr@core.net
To user1@rat2.core.net
Call ID xyz123
SDP Pktn: 1453

UE accepts the new session by sending back an OK message (step 7 in FIG. 8). Software download is recovered from SS and restarts from the packet it was interrupted at (i.e. packet 1453); after the new session is properly established, the old pending session is closed.

Figure 7:
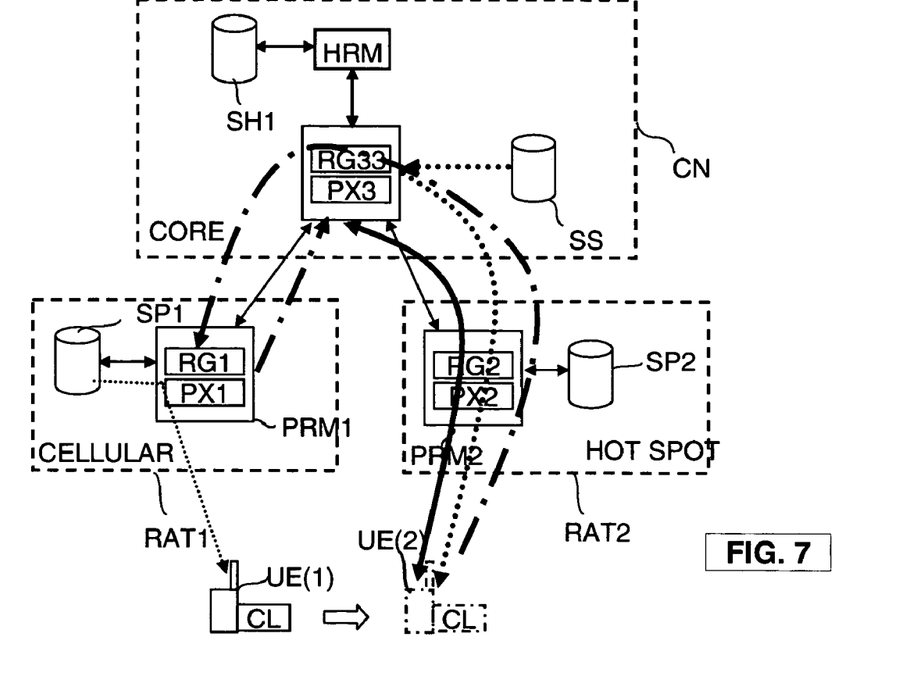
FIGS. 7 and 8 are a block diagram and a graph corresponding to FIGS. 3 and 4, respectively, and show the recovery of the software download considered in FIGS. 3 and 4.

FIGS. 7 and 8 show that, even if the session has been started at the PRM level (by PRM1), recovery is managed by the immediately upper level, i. e. by SRM, and not by the peer level PRM2 in RAT2. This choice has been made for reasons of signalling simplicity, by taking into account that a very heavy signalling would be necessary to transfer the download management to PRM2. on the other hand, the vertical handover generally will occur rather seldom, so that the burden on SRM is not heavily increased. Moreover, this choice results also in an improvement of the delay characteristics, even if this is not particularly important, since non-real-time traffic is considered.

Figure 9:
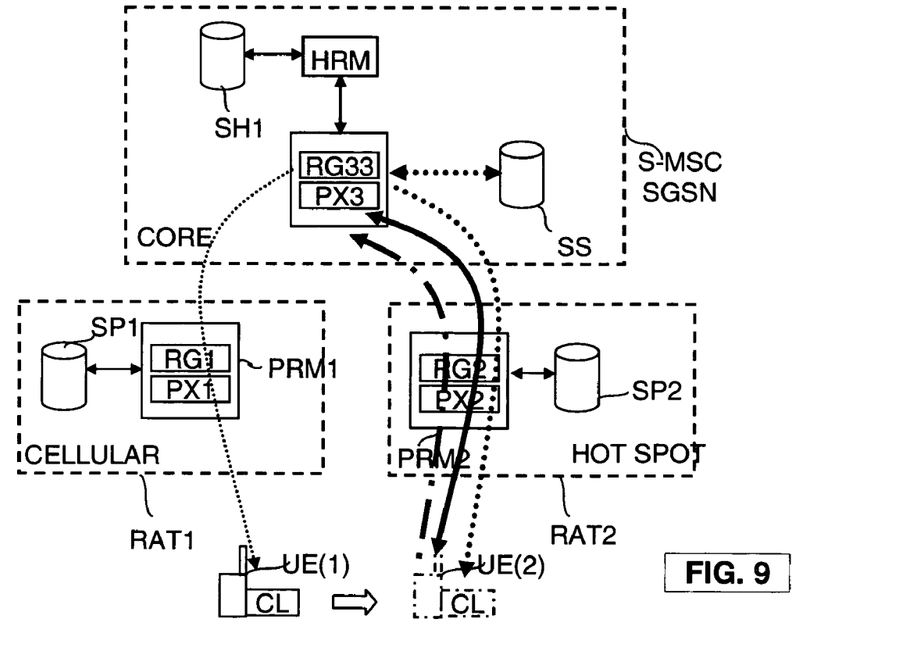
FIGS. 9 and 10 are a block diagram and a graph similar to FIGS. 7 and 8, respectively, and show the recovery of the software download considered in FIGS. 5 and 6.

In case of recovery of the software being downloaded from SRM (FIGS. 9 and 10), the procedure is similar: of course, no intervention of PRM1 takes place during recovery. In particular, UE sends now a "Refer" message to SRM in order to transfer the ongoing session to his new URL:

REFER user1@rat2.core.net
Via [prm2@rat2.core.net]
From srm@core.net
To prm1@rat2.core.net
Call ID xyz123
Refer to user1@rat2core.net
Referred by user1@rat1.core.net
SDP Pktn: 1453 and SRM sends UE the invite message as before. The operation continues as in the previous case.

As said before, the invention is based on a hierarchically expansible structure of the SIP servers. Thus, if the terminals have the possibility or the need of downloading software modules from SH1, a proxy and a registrar server will be hosted also by HRM; in such case, at least when the software location is not prealably known, the Register message will be forwarded up to HRM. In case software download management requires the intervention of HRM, clearly also recovery will require intervention of HRM.

In general it can be said that a download session set up by the lowest level proxies will be recovered by a proxy at the immediately higher level (PX3), whereas a session set up by an upper level proxy can be recovered by the same proxy by which it has been set up.

In case the target radio access technique RAT2 is connected to an SGSN other than that SGSN connected to RAT1, the hierarchical organisation is preferably exploited by having recovery managed by HRM (i. e. by the top hierarchical level). In such case, the "Refer" message to SRM (3 or 5 as the case may be) will trigger a "Refer" message to HRM, if software download was taking place from SRM or PRM1, whereas the "Refer" message will be sent directly by the client to HRM, if software download was taking place from HRM. HRM will then send the INVITE message to the client at its new URL.

The "old" SGSN could even directly request intervention of the "new" SGSN, which would then send the INVITE message to the client, even if this is a less preferred alternative.

It is evident that the above description has been given only by way of non limiting example and that changes and modifications are possible without departing from the scope of the invention, as defined in the appended claims.

So, even if the present invention has been disclosed with reference to a "conventional" mobile communication system, even if of a future generation. Since the invention is based on the use of SIP protocol, it could also be used as an application of an IMS platform or in general as a means for integration of reconfigurable functionalities in an IMS architecture.

We claim:

1. A method of handling an uninterrupted software download by a user equipment in an Internet Protocol (IP)—based mobile communication system during a handover between a first access network and a second access network using different access technologies, wherein a software download session is set up and managed by means of a session initiation protocol (SIP), wherein user agent applications and proxy and registrar servers are made available at the user equipment and within access and core networks, respectively, to handle SIP processes, comprising:

receiving in the second access network a new IP address and a new URL;

determining by said user agent application of the user equipment to be under a different access network;

sending by said user agent application of the user equipment, without releasing the software download session, a transfer request message to an SIP proxy server managing the software download session, said transfer request message containing information about the IP address and the URL in the first access network, the new URL, a session identity and a last software packet that has been successfully received, said transfer request message indicating to said SIP proxy server that the software download session is to be transferred to the user agent application at the new URL;

initiating at said SIP proxy server operations in order that a new session is set up with the user agent application at the new URL, under control of a further SIP proxy server assigned to manage the new session; and resuming said software download at said last received packet.

2. The method according to claim 1, further comprising, upon acceptance of the new session by the user agent application, releasing the software download session set up under the coverage of the first access network.

3. The method according to claim 1, further comprising:
downloading software from a plurality of software repositories accessible through download management units at different levels of a hierarchically arranged download management structure, wherein download management units at one intermediate level of said structure are associated with means for controlling packet services in the system; and organizing a hierarchical and modularly scalable structure of SIP servers, and hosting the SIP servers at each level of said hierarchical server structure in download management units at a given level of the download management structure, thereby establishing a correspondence between the two hierarchical structures.

4. The method according to claim 3, further comprising:
setting up a software download session for a registration phase of a user; and registering a corresponding user agent application with registrar servers at all hierarchical levels of the server structure, independently of a hierarchical level at which the software to be downloaded is accessible, whereby information on a user location is available at all levels of the hierarchical server structure.

5. The method according to claim 3, further comprising setting up software download sessions by SIP servers at a same hierarchical level as that of the software download management units through which the software to be downloaded is accessible.

6. The method according to claim 3, further comprising:
requesting a setting up of a session with a lowest level server; and in case the software to be downloaded is not present in a repository accessible at said lowest level, sending a session transfer request by said lowest level server to the user agent application requesting setting up the session with an upper level, the setting up request and the sending of the transfer request being repeated by each one of progressively higher levels until the setting up request reaches the level at which software is available.

7. The method according to claim 3, wherein software repositories accessible through download management units at levels higher than that associated with the lowest server level store software contained in repositories accessible through download management units at lower levels.

8. The method according to claim 3, wherein said hosting includes hosting proxy servers at a level immediately higher than a lowest level in the download management units associated with said means for controlling packet services, and wherein transferring to the second access network of a software download session set up in the first access network by a proxy server at the lowest level of the server structure is managed by a server at an immediately higher level, if the two access networks are connected to a same packet service control means.

9. The method according to claim 1, wherein said transfer request message sent by the user agent application to the managing server triggers in said managing server a second transfer message to a server at an immediately higher level and, upon receipt of said second transfer message, said higher level server sets up the new session.

10. The method according to claim 3, wherein the transfer to the second access network of the software download session set up in the first access network by a proxy server at a level of the server structure higher than a lowest one is managed by the same server having set up the session, if the two access networks are connected to a same packet service control means.

11. The method according to claim 3, wherein the first and second access networks are connected to a different packet service control means, and in wherein a session transfer Is managed by a server at a top hierarchical level, independently of the hierarchical level of the server having set up the session in the first access network.

* * * * *